United States Patent Office 3,255,202
Patented June 7, 1966

3,255,202
PROCESS FOR THE PREPARATION OF 2-(ACYL-AMIDOALKYL)BENZIMIDAZOLES
Herbert E. Johnson, South Charleston, W. Va., assignor to Union Carbide Corporation, a corporation of New York
No Drawing. Filed Aug. 23, 1963, Ser. No. 304,267
13 Claims. (Cl. 260—309.2)

This invention, in general, relates to novel 2-(acylamidoalkyl)benzimidazoles, and to a novel method for their preparation. More particularly, it relates to novel 2-(acylamidoalkyl)benzimidazoles, and to a novel method for their preparation from acylated α-amino amides and o-phenylenediamines in the presence of acidic media.

Benzimidazole and certain derivatives thereof are known to possess many useful properties. Some are useful in the textile industry as wetting, emulsifying, foaming, or softening agents or as dispersants for use in dyeing. Others are useful in the treatment of fibers to improve whiteness of the undyed material or as an optical bleach. A number of benzimidazoles have been used for the preparation of sulfur and azo dyes for use in the textile industry. Others have been used in the preparation of fluorescent dyes for use in such preparations as inks for marking clothes to be dry-cleaned. The mark becoming visible under ultraviolet light. Some benzimidazoles have found use in the photography industry to reduce photographic "fog" and to increase contrast and speed and hence have found particular use in photographic developing a fixing solution. Others have been found of value as anti-oxidants for rubber. Still others have found use in the preparation of sunburn preventatives by absorbing ultraviolet rays. Some benzimidazole salts are said to be of value in preparations for the care of the mouth and teeth. Certain benzimidazoles are of particular interest as pharmaceuticals or as intermediates for pharmaceuticals since they possess biological actions. A large number of benzimidazoles are reported to possess trypanosomicidal and spirocheticidal action and are active against disease caused by protozoa. Some are useful as antimalarials, anesthetics, antipyretics, antihistamines, anticonvulsants, antibiotics, bacteriostatics, fungicides, disinfectants, and growth-stimulants. Still others are useful in agricultural applications as insecticides, nematocides, fungicides, and bacteriocides. Some of these latter benzimidazoles posses multiple activities, combatting a variety of organisms which adversely affect agricultural products.

The 2-(acylamidoalkyl)benzimidazoles of this invention may have any of the above enumerated uses, but they are especially useful in agricultural applications as insecticides, fungicides, and nematocides since they combat a wide variety of organisms which attack plant life, as disclosed more fully hereinafter.

Heretofore, only a few 2-(acylamidoalkyl)benzimidazoles have been prepared since known methods for their preparation are beset with many disadvantages. These known methods are for the most part involved, lengthy, time consuming, costly an require a number of steps for completion. The novel method of the present invention overcomes the above disadvantages inherent in known methods and provides a convenient, economical and novel one-step method for the preparation of the aforementioned 2-(acylamidoalkyl)benzimidazoles.

It has now been found, quite unexpectedly, that 2-(acylamidoalkyl)benzimidazoles, in general, and the novel 2-(acylamidoalkyl)benzimidazoles of this invention, in particular, can be prepared in high yields and purity from readily available starting materials by a novel method which comprises reacting acylated α-amino amides with o-phenylenediamines in the presence of acidic media comprised of a suitable organic solvent and a strong acid, to be defined more fully hereinafter.

Accordingly, it is an object of this invention to provide novel 2-(acylamidoalkyl)benzimidazoles. It is another object to provide a novel method for the preparation of 2-acylamidoalkyl)benzimidozoles, in general, and the novel 2-(acylamidoalkyl)benzimidazoles of this invention, in particular. It is a further object to provide novel 2-(acylamidoalkyl)benzimidazoles which are particularly useful in agricultural applications. These and other objects will readily become apparent to those skilled in the art to which this invention pertains from the ensuing description thereof.

In general, the novel 2-(acylamidoalkyl)benzimidazoles of this invention can be represented by Formula (I):

(I) 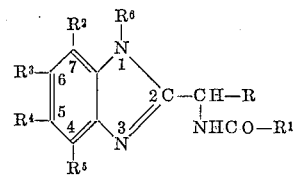

wherein R and R¹ are either alkyl, mercaptoalkyl, alkoxyalkyl, aminoalkyl, nitroalkyl, haloalkyl, alkylthioalkyl, alkylthio, alkoxy, alkenyl, mercaptoalkenyl, alkoxyalkenyl, aminoalkenyl, nitroalkenyl, haloalkenyl, cycloalkyl, mercaptocycloalkyl, alkoxycycloalkyl, aminocycloalkyl, nitrocycloalkyl, halocycloalkyl, cycloalkylthiocycloalkyl, cycloalkenyl, mercaptocycloalkenyl, alkoxycycloalkenyl, aminocycloalkenyl, nitrocycloalkenyl, halocycloalkenyl, aryl arylalkyl, alkoxyaryl, aryloxy, haloaryl, mercaptoaryl, aminoaryl, nitroaryl, haloarylalkyl, mercaptoarylalkyl, arylthio, arylthioaryl, alkaryl, aminoalkenyl, aminocycloalkyl, aminoaryl amines, carbalkoxy or carbaryloxy as well as primary, secondary, and tertiary alkylamines (primary and secondary amines should be in the form of an amine salt), and other like groups; R², R³, R⁴, and R⁵ are either hydrogen, halogen, nitro, amino, thio, alkoxy, alkyl, mercaptoalkyl, alkoxyalkyl, alkylthioalkyl, alkenyl, mercaptoalkenyl, alkoxyalkenyl, alkenylthioalkenyl, carboxyl, carboxyalkyl, carboxyalkenyl, carboxyaryl, carbalkoxy, carbalkenoxy, or carbaryloxy, as well as primary, secondary or tertiary alkylamines (primary and secondary amines should be in the form of an amine salt), and other like groups; and R⁶, which may originate from either one of the amino groups on the o-phenylenediamine, can be hydrogen, alkyl, aryl, aralkyl, or alkaryl groups.

The preferred 2-(acylaminoalkyl)benzimidazoles of this invention can be represented by Formula II:

(II) 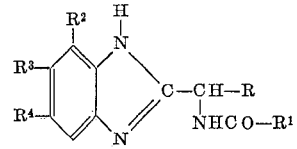

wherein R and R¹ are either mercaptoalkyl, aminoalkyl, nitroalkyl, or haloalkyl, with from 1 to 10 carbons in each of the aforementioned alkyl groups, alkoxy of from 1 to 10 carbon atoms, or aryl of from 6 to 10 carbon atoms; and R², R³, and R⁴ are either hydrogen, halogen, nitro, amino, thio, or alkoxy and alkyl groups of from 1 to 10 carbon atoms.

The most preferred 2-(acylamidoalkyl)benzimidazoles of this invention can be represented by Formula III:

(III)
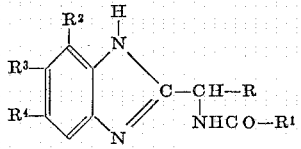

wherein R and $R^1$ are each alkyl of from 1 to 10 carbon atoms or aryl of from 6 to 10 carbon atoms, and $R^2$, $R^3$, and $R^4$ are each hydrogen, halogen, nitro, or alkyl groups of from 1 to 10 carbon atoms. Of this most preferred group, those wherein R and $R^1$ are each alkyl of from 1 to 5 carbon atoms or aryl of 6 carbon atoms, and $R^2$, $R^3$, and $R^4$ are each hydrogen, cholor, nitro, or alkyl of from 1 to 5 carbon atoms, are highly preferred.

Specific illustrative R variables are: R and $R^1$ wherein R and $R^1$ are each alkyl such as, methyl, ethyl, propyl, isopropyl, butyl, isobutyl, tert-butyl, pentyl, hexyl, heptyl, octyl, nonyl, and decyl; mercaptoalkyl such as, mercaptomethyl, 1-mercaptoethyl, 1-mercaptopropyl, 2-mercaptobutyl, 4-mercaptononyl, 3-mercaptopentyl, 4-mercaptohexyl, 5-mercaptoheptyl, 2-mercaptooctyl, 4-mercaptononyl, and 1-mercaptodecyl; aminoalkyl such as, aminomethyl, 1-aminoethyl, 1-aminopropyl, 2-aminobutyl, 3-aminopentyl, 4-aminohexyl, 5-aminoheptyl, 2-aminooctyl, 4-aminononyl, and 1-aminodecyl; 4-aminohexyl hydrochloride, 5-aminoheptyl hydrobromide, 2-aminooctyl hydrogen sulfide. 4-aminononyl hydrogen phosphate; nitroalkyl such as, nitromethyl, 1-nitroethyl, 1-nitropropyl, 2-nitrobutyl, 3-nitropentyl, 4-nitrohexyl, 5-nitroheptyl, 2-nitrooctyl, 4-nitrononyl and 1-nitrodecyl; haloalkyl such as halomethyl, 1-haloethyl, 1-halopropyl, 2-halobutyl, 3-halopentyl, 4-halohexyl, 5-haloheptyl, 2-halooctyl, 4-halononyl, and 1-halodecyl; alkoxy such as, methoxy, ethoxy, propoxy, butoxy, pentyloxy, hexyloxy, heptyloxy, octyloxy, nonyloxy, and decyloxy; alkoxalkyl such as methoxymethyl, ethoxymethyl, ethoxyethyl, and propoxypropyl; $R^2$, $R^3$, $R^4$, and $R^5$ are each hydrogen, chloro, bromo, iodo, nitro, thio, amino, carboxyl, carboxymethyl, carboxyethyl, carboxyvinyl, carboxyphenyl, methyl, ethyl, propyl, butyl, pentyl, hexyl, heptyl, octyl, nonyl, decyl, methoxy, ethoxy, propoxy, butoxy, pentyloxy hexyloxy, heptyloxy, octyloxy, nonyloxy, and decyloxy; and $R^6$ wherein $R^6$ is hydrogen, methyl, ethyl, propyl, butyl, pentyl, hexyl, heptyl, phenyl, naphthyl, benzyl, tolyl, xylyl, and the like.

Representative preferred 2-(acylamidoalkyl)benzimidazoles encompassed within this invention include, among others, 2-(1'-acetamidoethyl)benzimidazole,
2-(1'-acetamidopropyl)benzimidazole,
2-(1'-acetamidobutyl)benzimidazole,
2-(1'-acetamidoisobutyl)benzimidazole,
2-(1'-acetamidopentyl)benzimidazole,
2-(1'-acetamidohexyl)benzimidazole,
2-(1'-acetamidoheptyl)benzimidazole,
2-(1'-acetamidooctyl)benzimidazole,
2-(1'-acetamidononyl)benzimidazole,
2-(1'-acetamidodecyl)benzimidazole,
2-(1'-acetamido-2'-mercaptoethyl)benzimidazole,
2-(1'-acetamido-3'-mercapto-propyl)benzimidazole,
2-(1'-acetamido-2'-amino-ethyl)benzimidazole,
2-(1'-acetamido-3'-amino-propyl)benzimidazole,
2-(1'-acetamido-2'-nitro-ethyl)benzimidazole,
2-(1'-acetamido-3'-chloro-propyl)benzimidazole,
2-(1'-acetamido-2'-bromo-ethyl)benzimidazole,
2-(1'-acetamido-2'-iodo-ethyl)benzimidazole,
2-(1'-acetamido-3'-fluoro-propyl)benzimidazole,
2-(1'-acetamido-methoxy)benzimidazole,
2-(1'-acetamidoethoxy)benzimidazole,
2-(1'-acetamidoethyl)-5-chloro-benzimidazole,
2-(1'-acetamidoethyl)-5,6-dichloro-benzimidazole,
2-(1'-acetamidoethyl)-5,6,7-trichloro-benzimidazole,
2-(1'-acetamidopropyl)-7-bromo-benzimidazole,
2-(1'-acetamidoethyl)-5,6-dinitro-benzimidazole,
2-(1'-acetamidpropyl)-5,6,7-trinitro-benzimidazole,
2-(1'-acetamidopropyl)-5-amino-benzeimidazole,
2-(1'-acetamidoethyl)-5-methyl-benzimidazole,
2-(1'-acetamidropropyl)-6-ethyl-benzimidazole,
2-(1'-acetamidobutyl)-7-propyl-benzimidazole,
2-(1'-acetamidoethyl)-5,6,7-trimethyl-benzimidazole,
2-(1'-acetamidopropyl)-5-methyl-6-chloro-7-amino-benzimidazole,
2-(1'-acetamidopropyl)-5-thio-benzimidazole,
2-(1'-acetamidobutyl)-7-methoxy-benzimidazole,
2-(1'-acetamidopropyl)-5-hydroxy-benzimidazole,
2-(1'-acetamidoethyl)-5,6,7-trihydroxy,benzimidazole,
2-(1'-acetamidobenzyl)benzimidazole,
2-(1'-acetamidobenzyl)-5-chloro-6,7-dihydroxy-benzimidazole,
2-(1'-benzamidoethyl)benzimidazole,
2-(1'-benzamidopropyl)benzimidazole,
2-(1'-benzamidobutyl)benzimidazole,
2-(1'-benzamidophentyl)benzimidazole,
2-(1'-benzamidoheptyl)benzimidazole,
2-(1'-benzamidohexyl)benzimidazole,
2-(1'-benzamidooctyl)benzimidazole,
2-(1'-benzamidononyl)benzimidazole,
2-(1'-benzamidodecyl)benzimidazole,
2-(1'-benzamidobenzyl)benzimidazole,
2-(1'-benzamidobenzyl)-5,6,7-trichloro-benzimidazole,
2-(1'-benzamidobenzyl)-5,6-dinitro-7-methyl-benzimidazole,
2-(1'-benzamidobenzyl)-5-chloro-6-methyl-7-nitro-benzimidazole,
2-(1'-benzamido-2'-mercapto-ethyl)benzimidazole,
2-(1'-benzamido-3'-aminopropyl)benzimidazole,
2-(1'-benzamido-2'-nitro-ethyl)benzimidazole,
2-(1'-benzamido-2'-chloro-ethyl)benzimidazole,
2-(1'-benzamidoethyl)-5,6,7-trichloro-benzimidazole,
2-(1'-benzamidopropyl)-5,6,7-trinitro-benzimidazole,
2-(1'-benzamidobutyl)-5,6,7-trimethyl-benzimidazole,
2-(1'-benzamidoethyl)-5-methyl-6-chloro-7-nitro-benzimidazole,
2-(1'-benzamidoethyl)-5-thio-6,7-dimethoxy-benzimidazole,
2-(1'-benzamidopropyl)-5,6,7-trimethoxy-benzimidazole, and the like.

Representatives most preferred 2-(acylamidoalkyl)-benzimidazoles encompassed within this invention are:

2-(1'-acetamidoethyl)benzimidazole,
2-(1'-acetamidopropyl)benzimidazole,
2-(1'-acetamidoisoheptyl)benzimidazole,
2-(1'-acetamidobutyl)benzimidazole,
2-(1'-acetamidopentyl)benzimidazole,
2-(1'-acetamidohexyl)benzimidazole,
2-(1'-actamidoheptyl)benzimidazole,
2-(1'-acetamidooctyl)benzimidazole,
2-(1'-acetamidononyl)benzimidazole,
2-(1'-acetamidoethyl)-5-chloro-benzimidazole,
2-(1'-acetamidopropyl)-5,6-dichloro-benzimidazole,
2-(1'-acetamidobutyl)-5-chloro-7-nitro-benzimidazole,
2-(1'-acetamidobutyl)-6-nitro-benzimidazole,
2-(1'-acetamidobutyl)-6-methyl-benzimidazole,
2-(1'-acetamidobenzyl)-5-chloro-7-nitro-benzimidazole,
2-(1'-acetamidobenzyl)benzimidazole,
2-(1'-acetamidobenzyl)-5,6-dichloro-benzimidazole,
2-(1'-benzamidoethyl)benzimidazole,
2-(1'-benzamidoethyl)-6-methyl-benzimidazole,
2-(1'-benzamidropropyl)-5-chloro-7-nitro-benzimidazole,
2-(1'-benzamidopropyl)benzimidazole,
2-(1'-benzamidobutyl)benzimidazole,
2-(1'-benzamidohexyl)benzimidazole,
2-(1'-benzamidoheptyl)benzimidazole,
2-(1'-benzamidooctyl)benzimidazole,
2-(1'-benzamidononyl)benzimidazole,
2-(1'-benzamidodecyl)benzimidazole,
2-(1'-acetamidobutyl)benzimidazole, 2-(1'-acetamidoisobutyl)-6-methyl-benzimidazole,
2-(1'-benzamidoethyl)benzimidazole,
2-(1'-acetamidobenzyl)benzimidazole,
2-(1'-benzamidoethyl)-6-methyl-benzimidazole,
2-(1'-benzamidobutyl)-6-methyl-benzimidazole,
2-(1'-acetamidoisobutyl)-6-chloro-benzimidazole,
2-(1'-acetamidobutyl)-5,6-dichloro-benzimidazole,
2-(1'-acetamidobutyl)-6-nitro-benzimidazole,
2-(1'-benzamidoisobutyl)-6-nitro-benzimidazole,
2-(1'-benzamidobutyl)-5-chloro-7-nitro-benzimidazole,
2-(1'-acetamidoisobutyl)-5-chloro-7-nitro-benzimidazole,
2-(1'-acetamidobenzyl)-5-chloro-7-nitro-benzimidazole,
and the like.

In general, any 2-(acylamidoalkyl)benzimidazole, and the novel 2-(acylamidoalkyl)benzimidazoles of this invention, in particular, can be prepared in relatively pure form and in high yields by the novel method of this invention comprising the reaction of acylated α-amino amides with o-phenylenediamines in the presence of acidic media comprised of a suitable organic solvent and a strong acid. It is a requirement of this invention that the reaction be carried out in the presence of a strong acid.

The o-phenylenediamines used in the method of this invention can be either in the form of their free base or the strong acid addition salt thereof. Suitable strong acid addition salts include, among others, the monohydrochlorides, the monohydrobromides, the dihydrochlorides, the dihydrobromides, the mono- and disulfates, mono- and diphosphates, and like salts. The preferred o-phenyleneediamine because of their ready availability are the free bases and the dihydrochloride salts thereof.

The o-phenylenediamines used to prepare the compounds of this invention can be represented by Formula IV:

(IV)

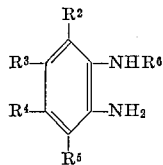

wherein $R^2$, $R^3$, $R^4$, $R^5$, and $R^6$ are as herein above defined with reference to Formulae I, II, and III; and the acid addition salts thereof. In Formula IV, $R^6$ can be on either amino group, that is, $R^6$ can be on either amino nitrogen atom.

Illustrative o-phenylenediamines which can be used as starting materials include, among others, o-Phenylenediamine,
o-Phenylenediamine dihydrochloride,
o-Phenylenediamine dihydrobromide,
o-Phenylenediamine monohydrochloride,
o-Phenylenediamine monohydrobromide,
6-chloro-o-phenylenediamine monohydrochloride,
o-Phenylenediamine dihydrogen sulfate,
o-Phenylenediamine monohydrosulfate,
o-Phenylenediamine dihydrogen phosphate,
o-Phenylenediamine monophosphoric acid,
4-methyl-o-phenylenediamine,
4,5,6-trimethyl-o-phenylenediamine,
5-nitro-o-phenylenediamine,
6-chloro-o-phenylenediamine dihydrochloride,
4-nitro-5-methyl-6-chloro-o-phenylenediamine,
4-hydroxy-o-phenylenediamine dihydrobromide,
4,5,6-trihydroxy-o-phenylenediamine,
4-amino-o-phenylenediamine dihydrochloride,
4,5-diamino-o-phenylenediamine dihydrochloride,
6-thio-o-phenylenediamine dihydrochloride,
4-methoxy-o-phenylenediamine dihydrochloride,
5-methyl-o-phenylenediamine,
5-methyl-o-phenylenediamine dihydrochloride,
5-chloro-o-phenylenediamine,
5-chloro-o-phenylenediamine dihydrochloride,
4,5-dichloro-o-phenylenediamine,
4,5-dichloro-o-phenylenediamine dihydrochloride,
5-nitro-o-phenylenediamine dihydrochloride,
4-nitro-6-chloro-o-phenylenediamine dihydrobromide,
and the like.

In general, the starting o-phenylenediamines used in the method of this invention can be prepared according to methods known in the art and disclosed in Encyclopedia of Chemical Technology, Vol. 10, pages 378–384, The Interscience Encyclopedia, Inc., New York (1953). For example, they can be prepared by reduction of the corresponding o-phenylenedinitro precursors with zinc dust and alkali or with sodium sulfide, and by treating an o-dihalobenzene with aqueous ammonia at about 150° C. under pressure in the presence of metallic cooper. The free base can then be readily converted to the acid addition salt by treatment with the desired strong acid according to methods known in the art.

The acylated α-amino amides used in the method of this invention can be represented by Formula V:

(V)

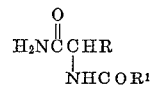

wherein R and $R^1$ are as defined with reference to Formulae I, II, and III.

Illustrative acylated α-amino amides which can be used as starting materials in the method of this invention, include, among others, acetylnorvalinamide, acetylvalinamide, acetylisoleucinamide, acetylalaninamide, acetylmethioninamide acetylsarcosinamide, acetylserinamide, acetyl-N-methylnorvalinamide, acetylglycinamide, acetylleucinamide, acetyllysinamide, and the like, as well as the acylated free α-amino acid amides of the α-amino acid amide hydrochlorides disclosed in Journal of Organic Chemistry, 27, at pp. 798 et seq., and others.

In general, the starting acylated α-amino amides of this invention can be prepared by acylation, that is by the replacement of a hydrogen atom attached to the nitrogen atom of an α-amino acide by an acyl group ($R^1CO$—), wherein $R^1$ is as herein above defined. Acylation procedures are known in the art such as, for example, the general method for acylation disclosed in Encyclopedia of Chemical Technology, Vol. 1, at page 670, The Interscience Encyclopedia, Inc., New York (1960). The acylated α-amino amides can be prepared by acylation of the α-amino amides disclosed in Journal of Organic Chemistry, 27, 798 (1962). For example, they can be prepared by treating the free α-amino amide with an acyl halide, such as acetyl chloride or a carboxylic acid anhydride, such as acetic anhydride. Other methods for the preparation of acylated α-amino amides are known in the art.

By the term "acidic media," as used herein, is meant an acidic medium composed of a suitable organic solvent and a strong acid. The strong acid in the acidic media can be supplied either by the strong acid from the strong acid addition salt of an o-phenylenediamine, e.g., hydrochloric acid from o-phenylenediamine dihydrochloride, or by introduction of a strong acid per se, e.g., hydrochloric acid, into the reaction mixture. It is a requirement that the reaction be carried out in the presence of a strong acid. This acid is part of the acidic media of this invention which is comprised of said acid and a suitable organic solvent.

Representative strong acids which can make up one part of the acidic media include, among others, hydrochloric acid, hydrobromic acid, hydroiodic acid, sulfuric acid, and phosphoric acid; strong aromatic sulfonic acids such as, benzenesulfonic acid, toluenesulfonic acid, naphthalenesulfonic acid, and other strong acids known in the art. Of the strong acids, strong mineral acids are preferred such as, hydrochloric, hydrobromic, hydroiodic, and the like, especially hydrochloric acid. In general, the pH of the reaction mixture should be no higher than 6 on the acid side, with a pH of from about 0.1 to about 3 preferred, and a pH of from about 0.1 to about 1, highly preferred. The acid medium must contain a strong acid in a minimum amount of at least one equivalent hydrogen ion per mole of o-phenylenediamine, and preferably two equivalents of hydrogen ion per mole of o-phenylenediamine. There is no upper limit on the amount of acid used except that dictated by consideration of economy.

Suitable organic solvents which can make up the other part of the acidic media include, among others, acidic organic solvents such as the aliphatic monocarboxylic acids (especially those containing from 1 to 9 carbon atoms), for example, formic acid, acetic acid, propionic acid, butyric acid, isobutyric acid, valeric acid, isovaleric acid, caproic acid, heptanoic acid, caprylic acid, crotonoic acid, nonanoic acid, and the like; non-acidic organic solvents such as the alcohols, particularly the alkanols of from 1 to 10 carbon atoms, for example, methyl alcohol, ethyl alcohol, propyl alcohol, butyl alcohol, tert-butyl alcohol; the ethers, particularly alkyethers of from 1 to 10 carbon atoms, for exampe, methyl ether, ethyl methyl ether, ethyl ether, ethyl propyl ether, propyl ether; and hydrocarbons, for example, benzene, naphthalene, xylene, toluene, and the like.

The novel method for the preparation of the 2-(acylamidoalkyl)benzimidazole of this invention can be illustrated by the following reaction scheme:

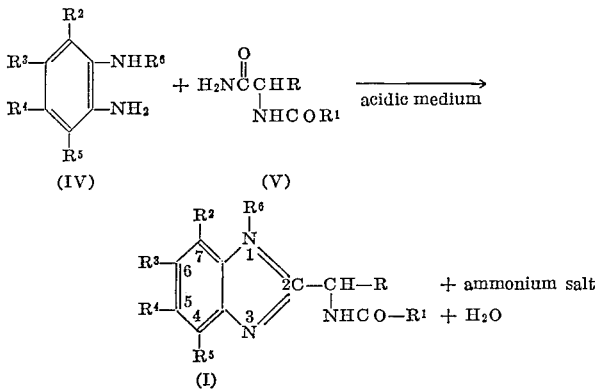

wherein R, $R^1$, $R^2$, $R^3$, $R^4$, $R^5$, and $R^6$ are as defined hereinabove with reference to Formulae I, IV, and V.

In the above reaction scheme, the o-phenylenediamine starting material IV, shown as the free base, reacts with the acylated α-amino amide starting material V in the presence of the acidic medium comprised of a strong acid and a suitable organic solvent, as disclosed herein, to give the corresponding 2-(acylamidoalkyl)benzimidazoles I, and, as by-products, the ammonium salt of the strong acid and water.

The method of this invention is particularly suitable for the preparation in high yields and relatively pure form of those 2-(acylamidoalky)benzimidazoles represented by Formulae II and III and defined herein above, especially those represented by Formula III.

The amount of o-phenylenediamine and acylated α-amino amide starting materials used in the method of this invention varies, of course, with the circumstances of each particular reaction and no hard and fast rule can be made. In general, the amount of o-phenylenediamine, expressed in terms of mole ratio of diamine to acylated α-amino acid, can range from about 1 to 10 to about 10 to 1, with a range of from about 0.8 to 1 to about 1.2 to 1 being preferred. In general, the amount of acylated α-amino amide, expressed in terms of acylated α-amino acid to diamine, can range from about 1 to 10 to about 10 to 1, with a range of from about 0.8 to 1 to about 1.2 to 1 being preferred. An amount of about 1 to 1 is highly preferred.

A highly preferred form of the method of this invention can be illustrated by the following reaction scheme:

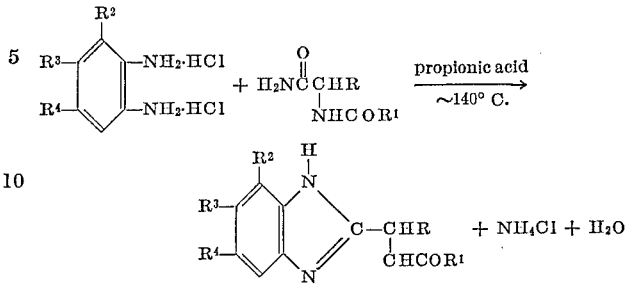

wherein R, $R^1$, $R^2$, $R^3$, and $R^4$ are as herein above defined with reference to Formulae I, II, and III, especially with reference to Formula III. In the above reaction scheme, the acidic medium is made up of the hydrochloric acid from the o-phenylenediamine dihydrochloride and propionic acid. The ammonium salt is the ammonium salt of hydrochloric acid.

The method illustrated by the above reaction scheme was highly unexpected in view of the previously observed behavior, under similar conditions of o-phenylenediamine dihydrochlorides and free α-amino amides in the presence of an acidic media containing hydrochloric acid and propionic acid as solvent. It was observed previously that a mixture of o-phenylenediamine hydrochloride and the free α-amino amide, norvalinamide failed to react with each other in the presence of an acidic medium composed of the alkanoic acid solvent, propionic acid and the strong acid, hydrochloric acid, derived from the diamine salt. Instead, the o-phenylenediamine reacted with the solvent propionic acid to give about 100 percent yield of 2-ethylbenzimidazole. This was the only reaction product that could be isolated from the reaction mixture.

The novel method of this invention was even more unexpected in view of the amount of acylated α-amino amide used as compared with the amount of solvent used in the acidic medium. The amount of acylated α-amino amide used to react with the o-phenylenediamine is very small compared to the amount of solvent present in the acidic medium.

The preferred acidic medium is the acidic organic solvent propionic acid with a strong mineral acid, e.g., hydrochloric acid, or the strong mineral acid addition salt of the o-phenylenediamine. Propionic acid is preferred since its reflux temperature (about 140° C.) is sufficiently high to allow the reaction between the o-phenylenediamines and the acylated α-amino amides to proceed at a reasonable rate, and it is a relatively good acidic solvent for the reactants. To specifically illustrate, one acidic medium is a mixture of o-phenylenediamine dihydrochloride in propionic acid and another is a mixture of o-phenylenediamine in propionic acid saturated with dry hydrogen chloride.

The reaction temperature for the method of this invention involving the reaction between the o-phenylenediamine and acylated α-amino amide can vary within wide limits. In general, it can range from about 50 to about 200° C., with a temperature of from about 100 to about 164° C., being preferred. The most preferred temperature is about 140° C.

The pressure of the method of this invention can range from superatmospheric, to subatmospheric, with atmospheric pressure being preferred. The most preferred pressure is about 1 atmosphere.

The end product 2-(acylamidoalkyl)benzimidazoles can be conveniently isolated by adding to the reaction mixture containing the 2-(acylamidoalkyl)benzimidazole, the ammonium salt, and water, additional water and adjusting the mixture to a slightly basic pH with a base, such as, sodium hydroxide solution, to precipitate the 2-(acylamidoalkyl)benzimidazole end product. The precipitated product is then collected by filtration and dried according to standard techniques. Although isolation of for 2-(acylamidoalkyl)benzimidazole is generally performed by neutralization of a water solution of the reaction mixture followed by filtration, other techniques can be used. For example, the reaction mixture can be distilled to remove the organic solvent, followed by neutralization of the residue, or the reaction mixture can be poured into water and extracted with a non-miscible solvent to recover the organic solvent followed by neutralization of the water solution.

ide solution the desired product precipitated. A total of 20 grams (82 percent) yield of 2-(1'-acetamidoisobutyl)-6-methyl-benzimidazole was obtained as off-white crystals, M.P. 270–275° C. Crystallization from ethanol gave pure 2-(1'-acetamidoisobutyl)-6-methyl-benzimidazole as colorless crystals, M.P. 273–275° C.

*Analysis.*—Calc. for $C_{14}H_{19}N_3O$: C, 68.54; H, 7.81; N, 17.13. Found: C, 68.20; H, 7.88; N, 17.39.

Following the procedure of Example II, the 2-(acylamidoalkyl)benzimidazoles tabulated in Table I also were prepared.

TABLE I.—2-(ACYLAMIDOALKYL)-BENZIMIDAZOLES

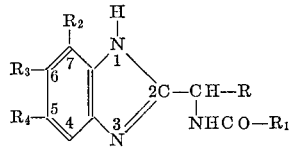

| Example | R | $R_1$ | $R_2$ | $R_3$ | $R_4$ | Percent Yield | M.P. | Calculated | | | Found | | |
|---|---|---|---|---|---|---|---|---|---|---|---|---|---|
| | | | | | | | | C | H | N | C | H | N |
| III. 2-(1'-benzamidoethyl)benzimidazole | $CH_3$ | $C_6H_5$ | H | H | H | 60 | 259–261 | 72.43 | 5.70 | 15.84 | 71.82 | 5.76 | 15.84 |
| IV. 2-(1'-acetamidobenzyl)benzimidazole | $C_6H_5$ | $CH_3$ | H | H | H | 58 | 243–245 | 72.43 | 5.70 | 15.84 | 72.17 | 5.83 | 14.88 |
| V. 2-(1'-benzamidoethyl)-6-methyl-benzimidazole | $CH_3$ | $C_6H_5$ | H | $CH_3$ | H | 90 | 214–216 | 73.09 | 6.13 | 15.04 | 73.29 | 6.14 | 14.97 |
| VI. 2-(1'-benzamidobutyl)-6-methyl-benzimidazole | $n-C_3H_7$ | $C_6H_5$ | H | $CH_3$ | H | 100 | 217–219 | 74.24 | 6.89 | 13.67 | 73.99 | 7.02 | 13.57 |
| VII. 2-(1'-acetamidoisobutyl)-6-chloro-benzimidazole | $i-C_3H_7$ | $CH_3$ | H | Cl | H | 83 | 278–282 | 58.75 | 6.07 | 15.82 | 58.57 | 6.24 | 15.53 |
| VIII. 2-(1'-acetamidobutyl)-5,6-dichloro-benzimidazole | $n-C_3H_7$ | $CH_3$ | H | Cl | Cl | 50 | 222–224 | 52.01 | 5.04 | 14.00 | 53.65 | 5.18 | 13.57 |
| IX. 2-(1'-acetamidobutyl)-6-nitro-benzimidazole | $n-C_3H_7$ | $CH_3$ | H | $NO_2$ | H | 69 | 232–233 | 56.51 | 5.84 | 20.28 | 56.58 | 6.06 | 20.42 |
| X. 2-(1'-benzamidoisobutyl)-6-nitro-benzimidazole | $i-C_3H_7$ | $C_6H_5$ | H | $NO_2$ | H | 78 | 229–231 | 63.89 | 5.36 | 16.56 | 63.87 | 5.35 | 16.33 |
| XI. 2-(1'-benzamidobutyl)-5-chloro-7-nitro-benzimidazole | $n-C_3H_7$ | $C_6H_5$ | $NO_2$ | H | Cl | 80 | 239–240 | 57.99 | 4.60 | 15.03 | 57.03 | 4.81 | 15.05 |
| XII. 2-(1'-acetamidoisobutyl)-5-chloro-7-nitro-benzimidazole | $i-C_3H_7$ | $CH_3$ | $NO_2$ | H | Cl | 73 | 289–290 | 50.24 | 4.87 | 18.03 | 50.30 | 5.05 | 17.38 |
| XIII. 2-(1'-acetamidobenzyl)-5-chloro-7-nitro-benzimidazole | $C_6H_5$ | $CH_3$ | $NO_2$ | H | Cl | 64 | 231–233 | 55.8 | 3.8 | 16.25 | 56.14 | 3.85 | 16.49 |

The following examples are illustrative of the 2-(acylamidoalkyl)benzimidazoles of this invention and the method for their preparation.

EXAMPLE I

2-(1'-acetamidobutyl)benzimidazole

A mixture of 32 grams (0.2 mole) of acetylnorvalinamide, 11 grams (0.1 mole) of o-phenylenediamine, and 150 ml. of propionic acid, was saturated with dry hydrogen chloride and heated under reflux for 5.5 hours. The reaction mixture was filtered to remove precipitated ammonium chloride and the filtrate evaporated in vacuo at about 100° C. The viscous residue was added to water and the resultant solution neutralized with a 20 percent solution of sodium hydroxide. Collection of the resultant solids afforded 12 grams (78 percent yield) of 2-(1'-acetamidobutyl)benzimidazole, which melted at 246–249° C., after several crystallizations from ethanol-water.

*Analysis.*—Calc. for $C_{13}H_{17}N_3O$: C, 67.50; H, 7.41; N, 18.17. Found: C, 67.33; H, 7.36; N, 18.11.

EXAMPLE II

2-(1'-acetamidoisobutyl)-6-methyl-benzimidazole

A mixture of 19.5 grams (0.1 mole) of 3,4-toluenediamine dihydrochloride, 16 grams (0.1 mole) of acetylvalinamide and 150 ml. of propionic acid, was refluxed for 1 hour. During this time the temperature of the solution dropped from 140° C. to about 133° C. and ammonium chloride precipitated. This precipitate was collected to give 4.7 grams (89 percent) and the filtrate diluted with 1.5 ml. of water. After making this water solution slightly basic with a 20 percent sodium hydroxide After neutralization, the 2-(acylamidoalkyl)benzimidazoles of this invention can readily by hydrolyzed with aqueous acid to give good yields of the corresponding free amine, which offers reactive sites for the preparation of other useful compounds. The following example is illustrative of this use of the compounds of this invention.

EXAMPLE XIV

2-(1'-aminoisobutyl)-6-methyl-benzimidazole

A 12 gram (0.05 mole) sample of 2-(1'-acetamidoisobutyl)-6-methyl-benzimidazole prepared as in Example II, was mixed with 150 ml. of concentrated hydrochloric acid and the solution refluxed for 3 hours. After cooling the mixture sufficient 20 percent sodium hydroxide solution was added to precipitate the product. Eight grams (80 percent) yield of 2-(1'-aminoisobutyl)-6-methylbenzimidazole was collected, M.P. 164–165° C. Two crystallizations from dilute aqueous alcohol afforded an analytical sample as colorless needles, M.P. 166–167° C.

*Analysis.*—Calc. for $C_{12}H_{17}N_3$: C, 70.90; H, 8.43; N, 20.67. Found: C, 70.93; H, 8.45; N, 20.62.

As disclosed hereinbefore, the 2-(acylamidoalkyl)benzimidazoles of this invention are particularly useful in agricultural applications. It has been found that 2-(1'-benzamidoisobutyl) - 6 - nitro - benzimidazole (Example X) has activity as both a fungicide and insecticide; that 2-(1'-benzamidoethyl)-6-methylbenzimidazole (Example V), 2-(1'-acetamidobutyl)-5,6-dichloro benzimidazole (Example VII) are both active as bactericides; and that 2-(1'-acetamidobutyl) - 6 - nitro-benzimidazole (Example IX) is active as a fungicide.

What is claimed is:

1. Process for the preparation of a 2-(acylamidoalkyl)benzimidazole of the formula:

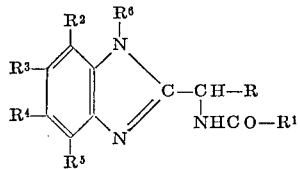

which comprises reacting an o-phenylenediamine selected from the group consisting of an o-phenylenediamine of the formula:

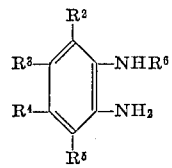

and the acid addition salts thereof, with an acylated α-amino amide of the formula:

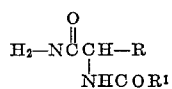

in the presence of an acidic medium composed of a suitable organic solvent and a strong acid, said medium having a pH up to 6 with a minimum amount of at least one equivalent hydrogen ion per mole of o-phenylenediamine, wherein R and $R^1$ selected from the group consisting of alkyl, mercaptoalkyl, alkoxyalkyl, aminoalkyl, nitroalkyl, haloalky, akylthioalkyl, alkylthio, alkoxy, alkenyl, mercaptoalkenyl, alkoxyalkenyl, aminoalkenyl, nitroalkenyl, haloalkenyl, cycloalkyl, hydroxycycloalkyl, mercaptocycloalkyl, alkoxycycoalkyl, aminocycloalkyl, nitrocycloakyl, halocycloalkyl, cycloalkylthiocycloalkyl, cycloalkenyl, mercaptoalkenyl, alkoxycycloalkenyl, aminocycloalkenyl, nitrocycloalkenyl, halocycloalkenyl, aryl, arylalkyl, nitroaryl, alkoxyaryl, aryloxy, haloaryl, hydroxyaryl, mercaptoaryl, aminoaryl, nitroaryl, haloarylalkyl, mercaptoarylalkyl, arylthio, arylthioaryl, alkaryl, aminoalkenyl, aminocycloalkyl, aminoalkyl, carbalkoxy, carbaryloxy, and aminoaryl containing up to 10 carbon atoms; $R^2$, $R^3$, $R^4$, and $R^5$ are each selected from the group consisting of hydrogen, halogen, nitro, amino, thio, alkoxy, alkyl, mercaptoalkyl, alkoxyalkyl, alkylthioalkyl, alkenyl, mercaptoalkenyl, alkoxyalkenyl, alkenylthioalkenyl, carboxyl, carboxyalkyl, carboxyalkenyl, carboxyaryl, carbalkoxy, carbalkenoxy, carbaryloxy, and aminoalkyl containing up to 10 carbon atoms; and $R^6$ is selected from the group consisting of hydrogen, alkyl, aryl, aralkyl, and alkaryl containing up to 10 carbon atoms.

2. Process for the preparation of a 2-(acylamidoalkyl)benzimidazole of the formula:

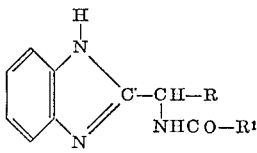

which comprises reacting an o-phenylenediamine selected from the group consisting of an o-phenylenediamine of the formula:

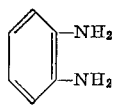

and the acid addition salts thereof, with an acylated α-amino amide of the formula:

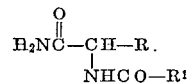

in the presence of an acidic medium composed of an aliphatic monocarboxylic acid of from 1 to 9 carbon atoms and hydrochloric acid, said medium having a pH up to 6 with a minimum amount of at least one equivalent hydrogen ion per mole of o-phenylenediamine, wherein R is alkyl of from 1 to 10 carbon atoms and $R^1$ is aryl of from 6 to 10 carbon atoms.

3. Process for the preparation of a 2-(acylamidoalkyl)benzimidazole of the formula:

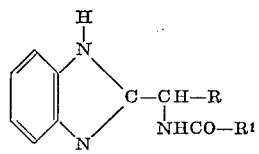

which comprises reacting an o-phenylenediamine of the formula:

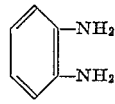

with an acylated α-amino amide of the formula:

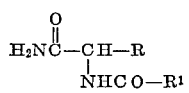

in the presence of an acidic medium composed of propionic acid and hydrochloric acid, said medium having a pH up to 6 with a minimum amount of at least one equivalent hydrogen ion per mole of o-phenylenediamine, wherein R is aryl of from 6 to 10 carbon atoms and $R^1$ is alkyl of from 1 to 10 carbon atoms.

4. Process for the preparation of 2-(1'-acetamidobutyl)benzimidazole which comprises reacting o-phenylenediamine with acetylnorvalinamide in the presence of propionic acid and hydrogen chloride at a pH up to 6 with a minimum amount of at least one equivalent hydrogen ion per mole of o-phenylenediamine.

5. Process for the preparation of 2-(1'-acetamidoisobutyl)-6-methyl-benzimidazole which comprises reacting 3,4-toluenediamine dihydrochloride with acetylvalinamide in the presence of propionic acid at a pH up to 6 with a minimum amount of at least one equivalent hydrogen ion per mole of o-phenylenediamine.

6. Process for the preparation of 2-(1'-acetamidoisobutyl)-6-chloro-benzimidazole which comprises reacting 5-chloro-o-phenylenediamine dihydrochloride with acetylvalinamide in the presence of propionic acid at a pH up to 6 with a minimum amount of at least one equivalent hydrogen ion per mole of o-phenylenediamine.

7. Process for the preparation of 2-(1'-acetamidobutyl-5,6-dichloro-benzimidazole which comprises reacting 4,5 - dichloro-o-phenylenediamine dihydrochloride with acetylnorvalinamide in the presence of propionic acid at a pH up to 6 with a minimum amount of at least one equivalent hydrogen ion per mole of o-phenylenediamine.

8. Process for the preparation of 2-(1'-acetamidobutyl)-6-nitro-benzimidazole which comprises reacting 5-nitro-o-phenylenediamine dihydrochloride with acetylnorvalinamide in the presence of propionic acid at a pH up to 6 with a minimum amount of at least one equivalent hydrogen ion per mole of o-phenylenediamine.

9. Process for the preparation of 2-(1'-acetamidoisobutyl)-5-chloro-7-nitro-benzimidazole which comprises reacting 4-chloro-6-nitro-o-phenylenediamine dihydrochloride with acetylvalinamide in the presence of propionic acid at a pH up to 6 with a minimum amount of at least one equivalent hydrogen ion per mole of o-phenylenediamine.

10. Process for the preparation of 2-(1'-benzamidoethyl) benzimidazole which comprises reacting o-phenylenediamine dihydrochloride with benzoylalaninamide in the presence of propionic acid at a pH up to 6 with a minimum amount of at least one equivalent hydrogen ion per mole of o-phenylenediamine.

11. Process for the preparation of 2-(1'-benzamidobutyl)-6-methyl-benzimidazole which comprises reacting 3,4-toluenediamine dihydrochloride with benzoylnorvalinamide in the presence of propionic acid at a pH up to 6 with a minimum amount of at least one equivalent hydrogen ion per mole of o-phenylenediamine.

12. Process for the preparation of 2-(1'-acetamidobenzyl)benzimidazole which comprises reacting o-phenylenediamine dihydrochloride with acetyl-β-phenylalaninamide in the presence of propionic acid at a pH up to 6 with a minimum amount of at least one equivalent hydrogen ion per mole of o-phenylenediamine.

13. Process for the preparation of 2-(1'-acetamidobenzyl)-5-chloro-7-nitro - 7 - benzimidazole which comprises reacting 4-chloro-6-nitro-o-phenylenediamine dihydrochloride with acetyl-β-phenylalaninamide in the presence of propionic acid at a pH up to 6 with a minimum amount of at least one equivalent hydrogen ion per mole of o-phenylenediamine.

References Cited by the Examiner
UNITED STATES PATENTS 3,004,982  10/1961  Hoffman et al. _____ 260—309.2
3,097,132  7/1963  Wiegand et al. _____ 167—33

OTHER REFERENCES

Crawford et al., Jour. Chem. Soc. (London), 1956, pages 673–75.

Hofmann, Imidazole and Its Derivatives, Part I, pages 260–265 (vol. 6 of the Chemistry of Heterocyclic Compounds) N.Y., Interscience, 1953.

Hughes et al., Chemical Abstracts, vol. 32, pages 5830–31 (1938) [abstract of article in Jour. Proc. Roy. Soc. N.S. Wales, vol. 71, pages 209–22 (1938)].

Sorm et al., Collection of Czechoslovak Chemical Communications, vol. 15, pages 196–203 (1950).

Weygand et al., Liebigs Annalen de Chemie, vol. 658, pages 140 and 149–50 (October 1962).

Wright Chemical Reviews, vol. 48, pages 397 and 423–25 (1951).

JOHN D. RANDOLPH, *Acting Primary Examiner.*

NATALIE TROUSOF, *Assistant Examiner.*